(12) United States Patent
Gur et al.

(10) Patent No.: US 9,135,350 B2
(45) Date of Patent: Sep. 15, 2015

(54) COMPUTER-GENERATED SENTIMENT-BASED KNOWLEDGE BASE

(75) Inventors: Nadav Gur, Palo Alto, CA (US); David Israel, Palo Alto, CA (US); Imri Goldberg, Zur Moshe (IL)

(73) Assignee: SRI INTERNATIONAL, Menlo Park, CA (US)

( * ) Notice: Subject to any disclaimer, the term of this patent is extended or adjusted under 35 U.S.C. 154(b) by 495 days.

(21) Appl. No.: 13/344,564

(22) Filed: Jan. 5, 2012

(65) Prior Publication Data

US 2013/0179423 A1 Jul. 11, 2013

(51) Int. Cl.
G06F 17/30 (2006.01)
G06Q 30/02 (2012.01)

(52) U.S. Cl.
CPC ...... *G06F 17/30867* (2013.01); *G06Q 30/0201* (2013.01)

(58) Field of Classification Search
CPC ................ G06F 17/30867; G06Q 30/0201
See application file for complete search history.

(56) References Cited

U.S. PATENT DOCUMENTS

| | | | |
|---|---|---|---|
| 6,910,003 B1 | 6/2005 | Arnold et al. | |
| 2006/0129446 A1* | 6/2006 | Ruhl et al. | 705/10 |
| 2008/0133488 A1* | 6/2008 | Bandaru et al. | 707/3 |
| 2008/0201348 A1* | 8/2008 | Edmonds et al. | 707/101 |

OTHER PUBLICATIONS

Mishne, Gilad, and Maarten De Rijke. "Capturing Global Mood Levels using Blog Posts." AAAI Spring Symposium: Computational Approaches to Analyzing Weblogs. 2006.*
"FASTUS: A Cascaded Finite-State Transducer for Extracting Information from Natural-Language Text", Jerry R. Hobbs, et al., Finite State Devices for Natural Language Processing, MIT Press, 1996.
"SRI International Fastus System MUC-6 Test Results and Analysis", Douglas E. Appelt, et al., Proceedings of the Sixth Message Understanding Conference, Columbia, MD 1995.
"FASTUS: A Finite-state Processor for Information Extraction" Real-World Text, Douglas E. Appelt, et al., Real-World Text, in Proceedings of IJCAI-93, Chambery, France, Sep. 1993.

* cited by examiner

*Primary Examiner* — Neveen Abel Jalil
*Assistant Examiner* — Kristofer Biskeborn
(74) *Attorney, Agent, or Firm* — Perkins Coie LLP

(57) ABSTRACT

A computer-automated method and system of providing a searchable knowledge base with decision-relevant attributes (including some subjective or sentiment-based attributes) for a plurality of individual items within a choice set are described. First, information (including texts) relevant to the plurality of individual items in the choice set is harvested from Internet sources. Next, normalized representations of statements are extracted from excerpts of the harvested texts that pertain to attributes of interest for the choice set, and corresponding scores for the attributes are derived from each of the normalized representations. The scores derived from the various harvested sources are aggregated for each attribute of each item. Finally, the knowledge base of the plurality of individual topics is generated.

33 Claims, 3 Drawing Sheets

COMPUTER-GENERATED SENTIMENT-BASED KNOWLEDGE BASE

FIELD OF THE INVENTION

At least one embodiment of the present invention pertains to Internet based information retrieval, and more particularly, to systems and methods for vertical search (that is, searches for information relevant to a particular topic or set of topics, such as a segment of commerce).

BACKGROUND

In today's world, the growth in popularity of computers and the Internet has fueled an increasing availability of information. Computers and the Internet have made searching for information more simplified as compared to searching through hardcopies of books and articles in a library. An Internet user typically enters and submits requests for information (queries) through a search engine. The search engine scrutinizes searchable digital documents on the Internet, identifies relevant information, and returns a list of documents deemed relevant to the query entered by the user. In addition, the search engine displays a link to each document.

One problem in a conventional information-retrieval system is that conventional information sources about items such as products, services, locations etc. typically provide information regarding a limited, pre-defined set of attributes pertaining to these items; moreover, especially in cases where the information is provided by a vendor of those items, this information may not be unbiased and hence may not be deemed trustworthy by the user. To complement such information, third party information sources that include reviews and descriptions of these same items may be used. An Internet user who is seeking information may therefore have to review multiple sites and/or multiple entries on the same site in order to try and form an informed and complete opinion of an item. Furthermore if the user is trying to assess multiple options and decide among them, for instance choose a product from a list of competing products, the search results may include hundreds or even thousands of documents. Even if these documents are ranked in terms of predicted relevance to the user's search requests, going through the documents, identifying the most truly pertinent ones, obtaining the pertinent information from them and then forming opinions about a list of competing products can be tedious and time-consuming.

For example, a hotel website may publish and aggregate structured or semi-structured presentations of hotel data (databases) that contain information like location, prices, room sizes, overall ratings (e.g. stars), and lists of amenities. However, many other details may be missing, and there may be no qualitative assessment of particular features that may be of importance to particular users, including subjective features such as how noisy each listed hotel (or its surroundings) is, or whether the views or athletic facilities are spectacular or mediocre. Such information may be available in professional reviews or in user-generated reviews/blogs. Moreover, a prospective customer may especially value the relatively unbiased views of independent reviewers, particularly with respect to subjective aspects of a property. However, reviews typically provide much of the relevant information in a relatively unstructured format (often natural language free text). Searching through individual reviews for specific information that a particular user may be interested in can also be onerous and time-consuming. Different reviewers may very well express differing views about subjective attributes, and reading only a few of such reviews may be misleading, as it may not provide a perspective consistent with the sentiment of most reviewers.

The present inventors have recognized that there is value in having searchable databases with detailed information about subject matter items, including information that is not generally available in existing structured and semi-structured databases and including both objective information (such as the price, location, etc. of a particular item) and subjective information (such as the quality of a given item attribute as perceived by other users/consumers, e.g. whether the spa is luxurious or the views are beautiful). The present inventors have identified a need to collect and extract such choice-relevant information in a systematic and computer-automated way from relatively unstructured sources, analyze it, aggregate it, and store it in a searchable knowledge base, and present both the analyzed information as well as the original source (e.g., text) that it was extracted from in a way that assists the user in searching for and finding decision-relevant information.

SUMMARY

The present disclosure addresses the need by providing a searchable knowledge base of decision-relevant features (or attributes) for a plurality of items (such as products or services) representing alternatives for the user. (We occasionally refer to this set of alternative items as a "choice set.")

In one embodiment of the present disclosure, a method of providing a searchable knowledge base for at least one choice set is disclosed. The method may comprise steps, each performed in a computer-automated manner, of: harvesting information relevant to said choice set from the Internet, analyzing the harvested texts and extracting normalized representations of statements in those texts pertaining to decision-relevant features (including at least some subjective features), scoring each of the normalized representations, aggregating the scores thus derived to generate a single score for each decision-relevant feature for each item in the choice set, and thereby generating the searchable knowledge base for the choice set.

In some embodiments of the present disclosure, the extraction and scoring of the normalized representations may employ a predefined rule-based grammar provided to the system, and/or statistical machine learning techniques can be applied by the system to a training set of exemplary processed texts in order to automatically derive a model for associating attributes and scores with particular language.

In a further embodiment, the aggregating of scores of attributes may further include algorithmic schemes for resolution of any inconsistency among the scores for a particular attribute of a particular item in the choice set, where these scores are associated with different statements within one, or more than one, of the harvested texts. According to yet another embodiment of the present disclosure, the method may further comprise the steps of annotating or indexing the harvested texts such that excerpts or blurbs that specifically support or address a particular attribute and/or score can easily be retrieved and displayed for users.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

References in this specification to "an embodiment", "one embodiment", or the like, mean that the particular feature, structure or characteristic being described is included in at least one embodiment of the present disclosure. Occurrences of such phrases in this specification do not necessarily all refer to the same embodiment.

Figure 1:
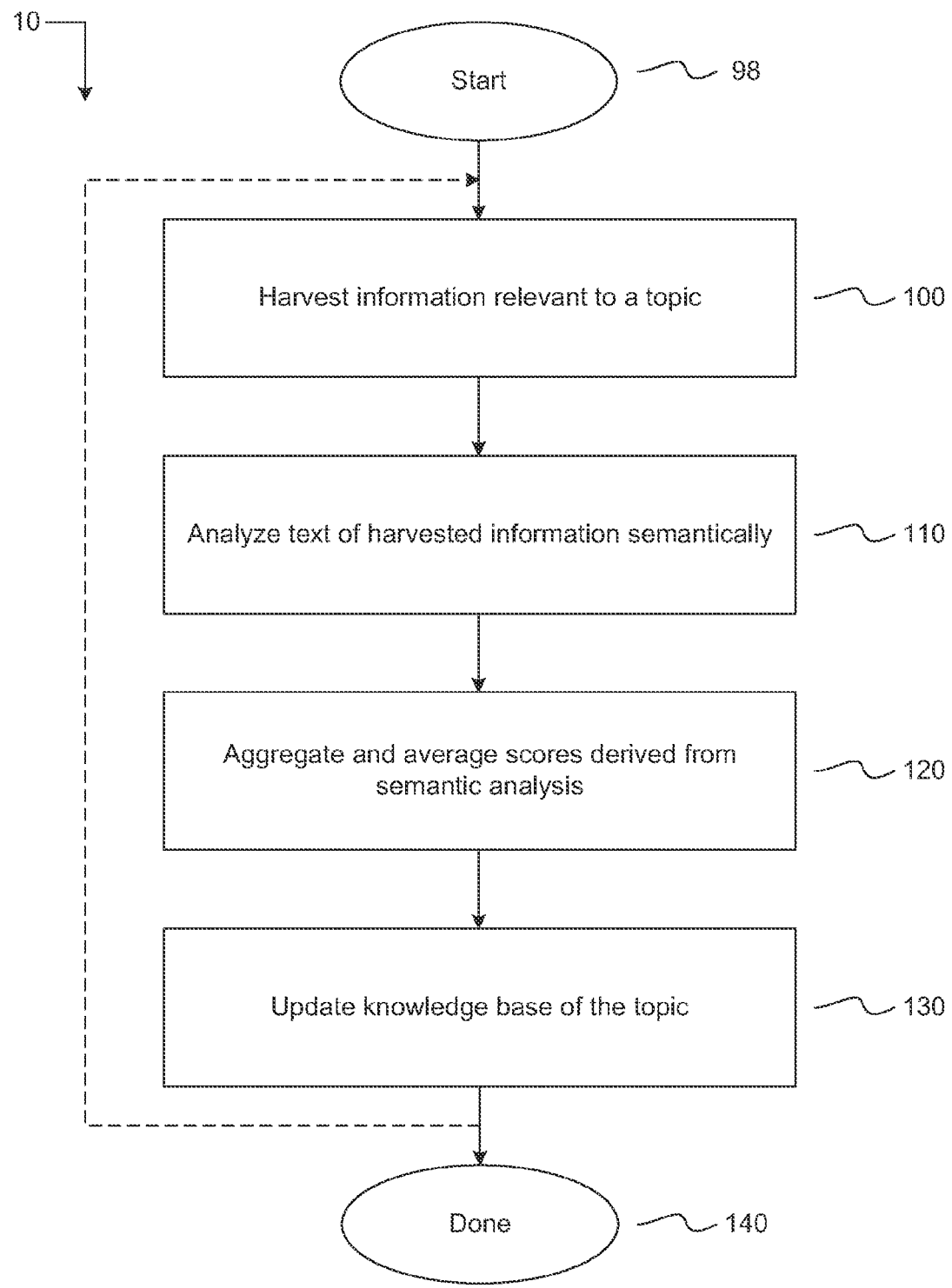
FIG. 1 is a flow diagram showing a method for generating knowledge base of a choice set according to one embodiment(s) of the present disclosure.

FIG. 1 illustrates a flow diagram of a process for generating knowledge base of a choice set according to one embodiment of the present disclosure. The process 10 is performed by one or more computer programs running on one or more computer systems. The computer systems each preferably include an operating system, such as but not limited to Windows™, Linux™, or Unix™. In some implementations, the computer system(s) may each comprising at least a computer readable medium, at least a processor or a central processing unit (CPU), network connection, one or more input/output (I/O) devices such as a keyboard, pen, voice input device, touch screen or other touch input device, a display, speakers, printer etc., and a bus that interconnects these components. The computer readable medium is any medium device that is configured to store data, such as a hard drive, RAM, ROM, flash memory, electrically erasable program read-only memory (EEPROM), CD-ROM, digital versatile disks (DVD), solid-state drive (SSD), magnetic media drive, or the like. The computer systems which perform steps of process 10 relating to creating and maintaining the knowledge base may be cloud-based servers; computer systems which are utilized by users to interact with the knowledge base may preferably include one or more personal computing devices such as, for example, a desktop or portable computer, a mobile computer or tablet, or a smartphone.

The process 10 begins at 98. In the step 98, the computer program is initialized, the code of the program is loaded into memory, and internal data structures are initialized. Next, in a step 100, information relevant to a choice set from the Internet is harvested, via the network connection. The information may pertain to each of different items or entities belonging to that choice set; for example, the choice set might be possible travel accommodations for an intended trip, and the items/entities in the set might be individual hotels.

Once the process 100 harvests information relevant to the choice set, a step 110 analyzes each text of harvested information semantically, to identify features or attributes of interest addressed in the text for entities in the choice set, and to assign corresponding scores for each of the attributes. (This step 110 itself comprises a multi-step process, described below in detail in connection with FIG. 3.) Next, a step 120 then aggregates the scores derived from semantic analysis of multiple texts for each attribute of each entity. In some implementations, the scores received for attributes may be weighted differently based on their source. For instance, in some implementations, scores from a professional's review may be assigned greater weights than those from a customer review; while the scores assigned to attributes in a customer's review may be assigned greater weights than those from a vendor itself or from its affiliates. In some implementations, the age or recency of a text is one of the criteria in the aggregation scheme, e.g., the scores assigned to attributes based on text that was generated more recently may be weighted more heavily than those assigned to attributes based on relatively older text.

A step 130 generates or updates, as the case may be, entries in the knowledge base for each of the entities associated with the choice set, including the aggregated scores for each of the attributes of each entity. The resulting knowledge base of the choice set is thus searchable by attribute, allowing e.g. queries for the entities having the best scores with respect to particular attributes or some combination of desired attributes. The process 10 is complete as indicated at 140 and may be cyclically or periodically performed to harvest and analyze more information.

Figure 2:
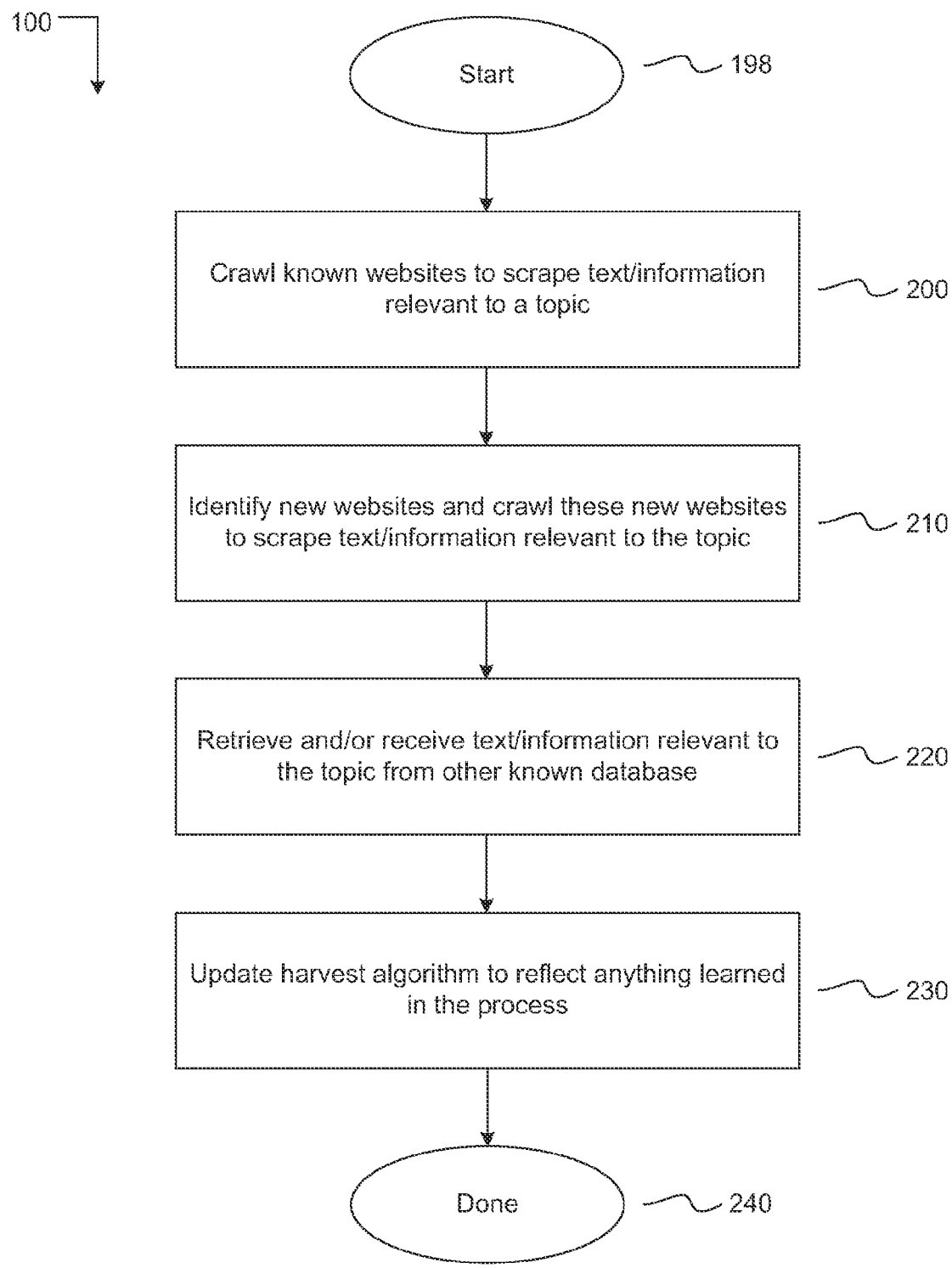
FIG. 2 is a flow diagram of a process for harvesting information relevant to a choice set according to another embodiment(s) of the present disclosure.

In FIG. 2, the process 100, "Harvesting information relevant to a choice set" of FIG. 1 is illustrated in greater detail according to another embodiment of the present disclosure. Information relevant to a choice set is harvested at step 100. For instance, if a choice set consists of hotels, the system crawls searchable websites and databases on the internet for information relevant to each of various hotels. The information harvested may include any type of item or content in text, audio or video format, including reviews, blogs, etc., related to each hotel. In some implementations, information in an audio format (or video that includes an audio channel) may be converted to a text format, for example by using a conventional automated speech recognition engine. Each text of harvested information, including review, blog, etc., may include the origin of the review/blog, the author of the review/blog, the date and time that the review/blog was created, etc. It should be noted that any reference herein to the Internet also would apply to, and is intended to include, a private Intranet that uses the standard Internet Protocol Suite (TCP/IP).

The process 100 begins at 198, and in a step 200, known websites are crawled to scrape text/information relevant to the choice set. Next, in a step 210, new websites may be identified and crawled to scrape text/information relevant to the choice set. A step 220 retrieves and/or receives text/information relevant to the choice set from one or more data feeds (e.g. real-time feeds such as Twitter) or other known databases, and the harvest algorithm is updated to reflect the results of the process in a step 230. For example, future harvesting to find updated information can focus on those sites and other data sources where relevant information has successfully been obtained in previous harvesting. The process is then completed at 240.

Figure 3:
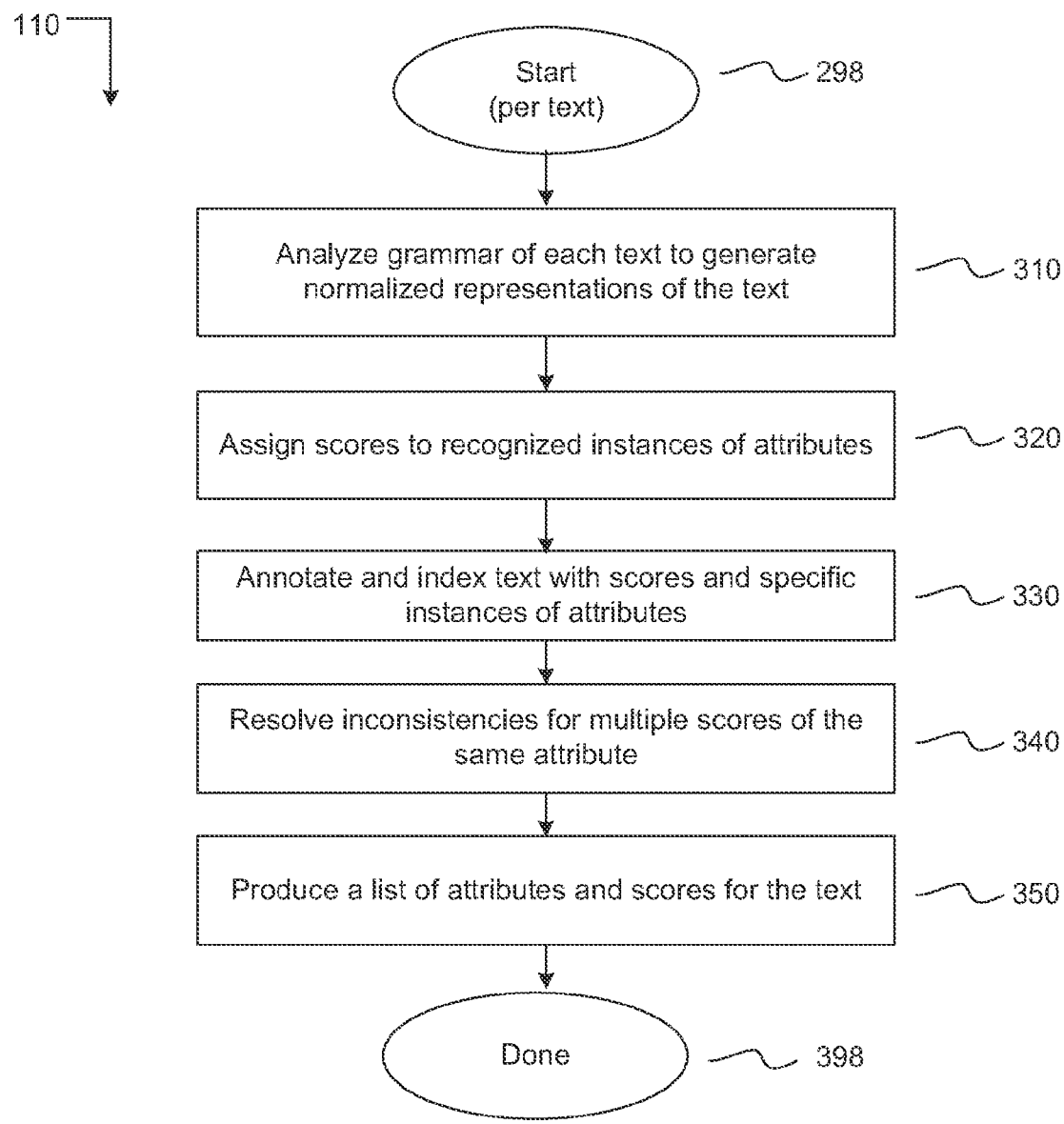
FIG. 3 is a flow diagram of a process for analyzing text of harvested information semantically according to yet another embodiment(s) of the present disclosure.

In FIG. 3, the process 110, "Analyzing text of harvested information semantically" of FIG. 1 is illustrated in greater detail according to an exemplary embodiment of the present disclosure. The process 110 begins at 298 for each text and in a step 310, each text is analyzed so as to recognize excerpts pertaining to attributes relevant to the choice set of interest, and to generate normalized representations of each such excerpt. In some implementations, normalized representations of statements are extracted from natural language text. Normalized representations essentially remove superficial, non-substantive differences among statements by reducing all statements to a common form, in order to facilitate further automated analysis. For instance, natural language statements such as "I found the rooms in Hotel X to be spacious" might be analyzed, in some embodiments, to yield the normalized representation: "the Room-Size of Hotel X is spacious," where "Room-Size" is one of the attributes of interest. Likewise, analysis of the statement "Our accommodations in Hotel X were very roomy" might yield a similar normalized representation, e.g. "the Room-Size of Hotel X is very roomy." As shown in this example, the extraction analysis recognized in the two excerpts that (a) "spacious" and "roomy" modified "rooms" and "accommodations", respectively, and (b) that these modifier-noun pairs both represent descriptors of Room-Size, a choice-set attribute.

In some implementations, text is analyzed syntactically in step 310 at least partly by using defined rules or grammars to generate normalized representations, such as in the following manner: fixed form expressions (e.g. names or addresses of entities in the choice set) are recognized first. Next, parsing may be applied to determine predicate-argument relations followed by anaphora resolution to link together various references to the same entity. The result of this textual analysis is a normalized representation for each of the decision-relevant excerpts, for instance presented as an XML file including the parse of the sentences and meta-data describing predicate-argument structure for the relevant objects and properties/attributes. In addition, a variety of well known syntactic, rule-based analysis techniques may be used to generate and represent normalized representations of harvested text. For instance, a cascaded, nondeterministic finite-state automaton may be employed. In stage 1, names and other fixed form expressions are recognized. In stage 2, basic noun groups, verb groups, and prepositions and some other particles are recognized. In stage 3, certain complex noun groups and verb groups are constructed. Patterns for attributes of interests are identified in stage 4 and corresponding "attribute structures" are built. In stage 5, distinct attribute structures that describe the same attribute are identified and merged. Machine learning techniques may also be applied to an exemplary training set of (e.g. manually labeled or annotated) processed texts, in order to derive a statistical language model for use in the extraction of normalized representations from harvested texts. In any case, each of the resulting normalized representations thus represents a recognized instance of an attribute for an item in the choice set.

The set of attributes for a choice set preferably includes objective attributes and subjective attributes. For instance, for hotels, objective attributes might include whether or not a given hotel has a swimming pool, while subjective attributes might include whether the hotel pool is considered beautiful or whether the rooms are considered spacious. In some implementations, a set of attributes specific to the choice set is predefined. In other embodiments, a vector of attributes may be dynamically constructed or expanded using machine learning algorithms. In such embodiments, an initial set of attributes may be provided from a known list; new attributes that were not included in the named list may be added algorithmically based on detection of excerpts in the texts of interest that mention or pertain to the new attributes. For instance, if many texts mention that a hotel is "close to the Metro," then the algorithmic process may learn that an attribute of "close to the Metro" should be added to the attribute vector for this choice set. To confirm the interest in a new attribute, the frequency of occurrence of the attribute over a plurality of texts pertaining to a particular choice set or to related choice sets (for instance, hotels at a particular destination or at several related destinations) may be considered.

Next, a step 320 assigns scores to recognized instances of attributes. In some implementations, each instance of a recognized attribute is assigned a score within a predefined scoring scale associated with the predefined set of attributes. For instance and purely by way of illustration, "+1" out of a scale from −2 to +2 may be assigned to an instance of the subjective attribute room spaciousness for Hotel X, when that instance is extracted from a review text describing Hotel X and stating that "the room was spacious," while another instance of the same attribute might be assigned a score of "+2" if the source text for the latter instance says "the rooms are incredibly spacious." In some implementations, machine learning and/or statistical algorithms may be applied to an exemplary training set of (e.g. manually) scored attribute instances in texts, to derive a model used to score the instances of attributes; a set of predefined scoring rules based on word patterns may also or alternatively be provided.

In step 330, each processed text is preferably annotated with the attributes and scores determined for that text, and with the portion or excerpt of text evidencing each such attribute/score. In some implementations, annotations may include one or more links to the source of selected texts. These annotations may be indexed in a manner facilitating subsequent retrieval of the relevant text evidencing a desired attribute for an entity in the database. Such indexing may be based in some implementations on a confidence level of the algorithm(s) that detected and scored the attribute instance in the text.

In step 340, if different scores were assigned to separate instances of a given attribute occurring within a single text—e.g., suppose a reviewer first says "the rooms were spacious" (+1), and later on states that she "loved the incredibly oversized rooms" (+2)—then those different scores are preferably resolved by employing a suitable resolution scheme. In some implementations, the scheme may be a statistical aggregation function such as average or median. In some implementations a rule-based scheme can be applied, for instance the score from the first or last occurrence may be used. In some implementations a machine learning algorithm may be trained to select the right score based on learning the correlation between scores in a particular text with the aggregate scores derived from an entire corpus. In some implementations a confidence score assigned by the statistical algorithm to each detected instance of an attribute may be used as a factor in determining the resolved/aggregate score where scores with higher confidence get a higher weight in the resolved/aggregate score.

Next in step 350 the list of attributes scored in the text and the aggregate score for each is produced.

The process 110 is completed at 398. The resulting lists of attributes and scores for all of the texts processed in accordance with the process of FIG. 3 can then be aggregated for each entity/item in the choice set in step 120, as described above, and the results can be incorporated into the knowledge base along with the associated text annotations in step 130. In some implementations, scores on different objective and subjective attributes for a given entity may be aggregated, for example if it is desired to provide a broader satisfaction metric covering a group of attributes (or all attributes) for each entity. Such aggregation may be performed, for example, by employing schemes or algorithms analogous to those described above in connection with steps 120 and 340, respectively.

It should be appreciated that the descriptions above are not limited in their applications to purely textual material. The disclosure is capable of adaptation to harvested information in other, non-textual media forms; for example, audio reviews (and/or video reviews containing an audio channel) may be converted to a form of text by using audio to text conversion, such as by use of an automated speech recognition engine, which is a well-known art. According to the present disclosure, a dynamically constructed and scored attribute vector for each specific hotel, attraction, consumer electronic product, etc., may be automatically generated. As a result, a searchable knowledge base covering a plurality of individual entities for each of various specific choice sets may be produced.

The foregoing description has been presented with reference to specific embodiments for purposes of illustration and explanation. However, the illustrative discussions above are not intended to be exhaustive or to limit the invention to the embodiments described. A person skilled in the art may appreciate that many modifications and variations are possible in view of the present disclosure.

What is claimed is:

1. A computer-automated method of generating a searchable knowledge base for a plurality of items in a choice set, each of said items having an associated set of attributes including at least one subjective attribute, comprising the steps of:
harvesting information relevant to each of said items as well as a source and an age of said harvested information from the Internet;
extracting a set of normalized representations from a corresponding set of statements in one or more texts of said harvested information;
analyzing the normalized representations to derive a set of scores for each attribute in said associated set of attributes for each of said items;
aggregating said derived scores, for said each attribute in said associated set of attributes, by assigning a weight to each of the scores based on at least the source and the age of said harvested information; and
incorporating attributes in said associated set of attributes and their corresponding aggregated scores, for each of said items, into said searchable knowledge base for said choice set, wherein a computer processor is utilized to automatically perform each of steps, the incorporating including:
annotating a first statement harvested for a first item of the plurality of items with a first set of attributes and a corresponding first set of scores to generate a first annotation, the first set of attributes associated with the first item and determined based on an analysis of text in the first statement, the first statement being one of multiple statements harvested for the first item, the first annotation being one of multiple annotations in the searchable knowledge base, the first annotation including a link to the first statement, and
indexing the annotations in the searchable knowledge base to facilitate retrieval of a statement of the statements that corresponds to an input attribute.

2. A method as recited in claim 1, further comprising extracting texts of said harvested information by automated voice recognition, wherein said harvested information includes audio information.

3. A method as recited in claim 1, wherein said harvesting further comprises the steps of: crawling a set of websites to scrape information relevant to said choice set; receiving information relevant to said choice set from a set of other data sources including a data feed or a database; and updating said set of websites and said set of other data sources that are harvested based on a result of said crawling and said receiving.

4. A method as recited in claim 1, wherein said associated set of attributes further includes one or more objective attributes.

5. A method as recited in claim 1, wherein said extracting comprises using a model derived by one or more statistical machine learning algorithms.

6. A method as recited in claim 1, wherein said extracting comprises applying a predefined set of rules.

7. A method as recited in claim 1, further comprising the step of resolving one or more inconsistencies between a plurality of said derived scores for a particular attribute in said associated set of attributes for a particular one of said items, said inconsistent scores derived from a single one of texts of said harvested information, by combining said inconsistent scores in an algorithmic manner.

8. A method as recited in claim 1, wherein a plurality of said derived scores for a particular attribute in said associated set of attributes for a particular one of said items are each derived from different corresponding ones of texts of said harvested information, and said aggregating further comprises combining said plurality of derived scores by assigning a weight to each of said plurality of said derived scores at least partly based on one or more characteristics of said different corresponding ones of texts.

9. A method as recited in claim 1, further comprising the step of constructing an index that may be used to search for and display a relevant portion of texts of said harvested information evidencing a specific attribute and score for a particular one of said items in said choice set.

10. A method as recited in claim 1, further comprising the steps of dynamically expanding said set of attributes based on an algorithmic analysis of texts of said harvested information.

11. A method as recited in claim 10, wherein said algorithmic analysis is based on a frequency of occurrence of a new attribute in one or more of texts of said harvested information.

12. A non-transitory computer program embodied on a computer readable medium for generating a searchable knowledge base for a plurality of items in a choice set, each of said items having an associated set of attributes including at least one subjective attribute, comprising:
instructions for harvesting information relevant to each of said items and an age of said harvested information from the Internet;
instructions for extracting a set of normalized representations from a corresponding set of statements in one or more texts of said harvested information;
instructions for analyzing the normalized representations to derive a set of scores for each attribute in said associated set of attributes for each of said items;
instructions for aggregating said derived scores, for said each attribute in said associated set of attributes, by assigning a weight to each of the scores based on at least the age of said harvested information; and
instructions for incorporating attributes in said associated set of attributes and their corresponding aggregated scores, for each of said items, into said searchable knowledge base for said choice set, wherein a computer processor is utilized to automatically perform each of said instructions, the incorporating including:
annotating a first statement harvested for a first item of the plurality of items with a first set of attributes and a corresponding first set of scores to generate a first annotation, the first set of attributes associated with the first item and determined based on an analysis of text in the first statement, the first statement being one of multiple statements harvested for the first item, the first annotation being one of multiple annotations in the searchable knowledge base, the first annotation including a link to the first statement, and
indexing the annotations in the searchable knowledge base to facilitate retrieval of a statement of the statements that corresponds to an input attribute.

13. A computer program as recited in claim 12, further comprising instructions for extracting texts of said harvested information by automated voice recognition, wherein said harvested information includes audio information.

14. A computer program as recited in claim 12, wherein said instructions for harvesting further comprises: instructions for crawling a set of websites to scrape information relevant to said choice set; instructions for receiving information relevant to said choice set from a set of other data sources including a data feed or a database; and instructions for updating said set of websites and said set of other data sources that are harvested based on a result of said crawling and said receiving.

15. A computer program as recited in claim 12, wherein said associated set of attributes further includes one or more objective attributes.

16. A computer program as recited in claim 12, wherein said instructions for extracting comprises instructions for using a model derived by one or more statistical machine learning algorithms.

17. A computer program as recited in claim 12, wherein said instructions for extracting comprises instructions for applying a predefined set of rules.

18. A computer program as recited in claim 12, further comprising instructions for resolving one or more inconsistencies between a plurality of said derived scores for a particular attribute in said associated set of attributes for a particular one of said items, said inconsistent scores derived from a single one of texts of said harvested information, by combining said inconsistent scores in an algorithmic manner.

19. A computer program as recited in claim 12, wherein a plurality of said derived scores for a particular attribute in said associated set of attributes for a particular one of said items are each derived from different corresponding ones of texts of said harvested information, and said instructions for aggregating further comprises instructions for combining said plurality of derived scores by assigning a weight to each of said plurality of said derived scores at least partly based on one or more characteristics of said different corresponding ones of texts.

20. A computer program as recited in claim 12, further comprising instructions for constructing an index that may be used to search for and display a relevant portion of texts of said harvested information evidencing a specific attribute and score for a particular one of said items in said choice set.

21. A computer program as recited in claim 12, further comprising instructions for dynamically expanding said set of attributes based on an algorithmic analysis of texts of said harvested information.

22. A computer program as recited in claim 21, wherein said algorithmic analysis is based on a frequency of occurrence of a new attribute in one or more of texts of said harvested information.

23. A searchable knowledge base for a plurality of items in a choice set, each of said items having an associated set of attributes including at least one subjective attribute, comprising:
    at least a processor;
    at least a computer readable medium, coupled to the Internet;
    a bus that interconnects said at east a processor and said at least a computer readable storage; and
    a computer program embodied on said at least a computer readable medium, said computer program comprising:
        instructions for harvesting information relevant to each of said items and a source of said harvested information from the Internet;
        instructions for extracting a set of normalized representations from a corresponding set of statements in one or more texts of said harvested information;
        instructions for analyzing the normalized representations to derive a set of scores for each attribute in said associated set of attributes for each of said items;
        instructions for aggregating said derived scores, for said each attribute in said associated set of attributes, by assigning a weight to each of the scores based on at least the source of the one or more texts; and
        instructions for incorporating attributes in said associated set of attributes and their corresponding aggregated scores, for each of said items, into said searchable knowledge base for said choice set, wherein a computer processor is utilized to automatically perform each of said instructions, the incorporating including:
            annotating a first statement harvested for a first item of the plurality of items with a first set of attributes and a corresponding first set of scores to generate a first annotation, the first set of attributes associated with the first item and determined based on an analysis of text in the first statement, the first statement being one of multiple statements harvested for the first item, the first annotation being one of multiple annotations in the searchable knowledge base, the first annotation including a link to the first statement, and
            indexing the annotations in the searchable knowledge base to facilitate retrieval of a statement of the statements that corresponds to an input attribute.

24. A searchable knowledge base as recited in claim 23, wherein said computer program further comprises instructions for extracting texts of said harvested information by automated voice recognition, wherein said harvested information includes audio information.

25. A searchable knowledge base as recited in claim 23, wherein said instructions for harvesting further comprises: instructions for crawling a set of websites to scrape information relevant to said choice set; instructions for receiving information relevant to said choice set from a set of other data sources including a data feed or a database; and instructions for updating said set of websites and said set of other data sources that are harvested based on a result of said crawling and said receiving.

26. A searchable knowledge base as recited in claim 23, wherein said associated set of attributes further includes one or more objective attributes.

27. A searchable knowledge base as recited in claim 23, wherein said instructions for extracting comprises instructions for using a model derived by one or more statistical machine learning algorithms.

28. A searchable knowledge base as recited in claim 23, wherein said instructions for extracting comprises instructions for applying a predefined set of rules.

29. A searchable knowledge base as recited in claim 23, wherein said computer program further comprises instructions for resolving one or more inconsistencies between a plurality of said derived scores for a particular attribute in said associated set of attributes for a particular one of said items, said inconsistent scores derived from a single one of texts of said harvested information, by combining said inconsistent scores in an algorithmic manner.

30. A searchable knowledge base as recited in claim 23, wherein a plurality of said derived scores for a particular attribute in said associated set of attributes for a particular one of said items are each derived from different corresponding ones of texts of said harvested information, and said instructions for aggregating further comprises instructions for combining said plurality of derived scores by assigning a weight to each of said plurality of said derived scores at least partly based on one or more characteristics of said different corresponding ones of texts.

31. A searchable knowledge base as recited in claim 23, wherein said computer program further comprises instructions for constructing an index that may be used to search for and display a relevant portion of texts of said harvested information evidencing a specific attribute and score for a particular one of said items in said choice set.

32. A searchable knowledge base as recited in claim 23, wherein said computer program further comprises instructions for dynamically expanding said set of attributes based on an algorithmic analysis of texts of said harvested information.

33. A searchable knowledge base as recited in claim 23, wherein said algorithmic analysis is based on a frequency of occurrence of a new attribute in one or more of texts of said harvested information.

\* \* \* \* \*